(12) United States Patent
Baker

(10) Patent No.: US 8,783,758 B2
(45) Date of Patent: Jul. 22, 2014

(54) FOLDING SIDE SKIRT SYSTEM FOR A TRAILER

(71) Applicant: Leonard W. Baker, Lafayette, IN (US)

(72) Inventor: Leonard W. Baker, Lafayette, IN (US)

(73) Assignee: Wabash National, L.P.

( * ) Notice: Subject to any disclaimer, the term of this patent is extended or adjusted under 35 U.S.C. 154(b) by 0 days.

(21) Appl. No.: 13/847,111

(22) Filed: Mar. 19, 2013

(65) Prior Publication Data

US 2013/0249241 A1 Sep. 26, 2013

Related U.S. Application Data

(60) Provisional application No. 61/613,652, filed on Mar. 21, 2012.

(51) Int. Cl.
B62D 35/00 (2006.01)

(52) U.S. Cl.
USPC ................................. 296/180.4; 296/180.5

(58) Field of Classification Search
USPC .............. 294/180.1, 180.4, 180.5; 296/180.1, 296/180.4, 180.5
See application file for complete search history.

(56) References Cited

U.S. PATENT DOCUMENTS

| | | |
|---|---|---|
| 357,800 A | 2/1887 | Wescott |
| 495,801 A | 4/1893 | Henthorne |
| 564,027 A | 7/1896 | Pratt |
| 824,541 A | 6/1906 | Hager et al. |
| 1,127,241 A | 2/1915 | Hawksworth |
| 2,318,863 A | 5/1943 | Otto |
| 2,737,411 A | 3/1956 | Potter |
| 3,256,655 A | 6/1966 | Teter |
| 3,401,953 A | 9/1968 | Prohl et al. |
| 3,483,939 A | 12/1969 | Maddock et al. |
| 3,608,928 A | 9/1971 | Hooker |
| 3,711,146 A | 1/1973 | Madzsar et al. |
| 3,852,965 A | 12/1974 | Rudd |
| 3,859,797 A | 1/1975 | Ayers |
| 4,006,932 A | 2/1977 | McDonald |
| 4,045,962 A | 9/1977 | Preus |
| 4,060,268 A | 11/1977 | Page, Jr. |

(Continued)

FOREIGN PATENT DOCUMENTS

| | | |
|---|---|---|
| EP | 0 738 621 A1 | 10/1996 |
| EP | 0 857 620 A1 | 8/1998 |
| WO | 03/093066 A1 | 11/2003 |

OTHER PUBLICATIONS

Office action in U.S. Appl. No. 13/413,998 dated Nov. 2, 2012 (9 pages).

(Continued)

Primary Examiner — Joseph Pape

(57) ABSTRACT

A side skirt system for reducing drag on a trailer includes a side skirt wall configured to be coupled to one side of the trailer to extend generally below a storage container of the trailer at least partially along a length of the trailer. The side skirt wall includes (i) a first wall panel having a first end configured to be pivotably coupled to a rear wheel assembly of the trailer and (ii) a second wall panel having a first end pivotably coupled to a second end of the first wall panel and a second end configured to be pivotably coupled to a rear portion of the trailer. The side skirt wall is movable between a fully-extended position wherein the first and second wall panels cooperate to define a generally planar side skirt wall and a fully-retracted position wherein the first and second wall panels are angled relative to each other.

22 Claims, 7 Drawing Sheets

(56) References Cited

U.S. PATENT DOCUMENTS

| | | |
|---|---|---|
| 4,104,884 A | 8/1978 | Preus |
| 4,142,755 A | 3/1979 | Keedy |
| 4,190,381 A | 2/1980 | Knaus et al. |
| 4,236,745 A | 12/1980 | Davis |
| 4,282,946 A | 8/1981 | MacGuire |
| 4,421,333 A | 12/1983 | VanDyke |
| 4,611,847 A | 9/1986 | Sullivan |
| 4,688,824 A | 8/1987 | Herring |
| 4,746,160 A | 5/1988 | Wiesemeyer |
| 4,943,204 A | 7/1990 | Ehrlich |
| 5,058,945 A | 10/1991 | Elliott, Sr. et al. |
| 5,094,744 A | 3/1992 | Scovell |
| 5,152,228 A | 10/1992 | Donkin |
| 5,280,990 A | 1/1994 | Rinard |
| D354,726 S | 1/1995 | Fitzgerald et al. |
| 5,489,137 A | 2/1996 | Herrmeyer |
| 5,607,200 A | 3/1997 | Smidler |
| 5,673,953 A | 10/1997 | Spease |
| 5,823,610 A | 10/1998 | Ryan |
| 5,921,617 A | 7/1999 | Loewen et al. |
| 6,079,769 A | 6/2000 | Fannin et al. |
| 6,092,861 A | 7/2000 | Whelan |
| 6,109,675 A | 8/2000 | Sumrall |
| 6,116,667 A | 9/2000 | Torcomian |
| 6,257,654 B1 | 7/2001 | Boivin et al. |
| 6,286,894 B1 | 9/2001 | Kingham |
| 6,309,010 B1 | 10/2001 | Whitten |
| 6,409,252 B1 | 6/2002 | Andrus |
| 6,443,492 B1 | 9/2002 | Barr et al. |
| 6,467,833 B1 | 10/2002 | Travers |
| 6,485,087 B1 | 11/2002 | Roberge et al. |
| 6,595,578 B1 | 7/2003 | Calsoyds et al. |
| 6,626,475 B2 | 9/2003 | Schroeder |
| 6,644,720 B2 | 11/2003 | Long et al. |
| 6,666,498 B1 | 12/2003 | Whitten |
| 6,799,791 B2 | 10/2004 | Reiman et al. |
| 6,837,536 B1 | 1/2005 | Schwartz |
| 6,893,079 B1 | 5/2005 | Johnson et al. |
| 6,915,611 B2 | 7/2005 | Reiman et al. |
| 6,959,958 B2 | 11/2005 | Basford |
| 6,974,166 B2 | 12/2005 | Ledford et al. |
| 6,974,178 B2 | 12/2005 | Ortega |
| 7,059,819 B2 | 6/2006 | Brackmann et al. |
| 7,086,674 B2 | 8/2006 | Goertz |
| 7,093,889 B2 | 8/2006 | Graham |
| 7,134,820 B2 | 11/2006 | Ehrlich |
| 7,147,270 B1 | 12/2006 | Andrus et al. |
| 7,163,258 B2 | 1/2007 | Dyer, II et al. |
| 7,188,875 B2 | 3/2007 | Norelius |
| 7,347,154 B2 | 3/2008 | Evans |
| 7,404,592 B2 | 7/2008 | Reiman et al. |
| 7,407,204 B2 | 8/2008 | Eriksson et al. |
| 7,497,502 B2 | 3/2009 | Wood |
| 7,537,270 B2 | 5/2009 | O'Grady |
| 7,578,541 B2 | 8/2009 | Layfield et al. |
| 7,604,284 B2 | 10/2009 | Reiman et al. |
| 7,665,716 B2 | 2/2010 | Reast |
| 7,686,385 B2 | 3/2010 | Dolan et al. |
| 7,740,303 B2 | 6/2010 | Wood |
| 7,748,772 B2 | 7/2010 | Boivin et al. |
| 7,780,224 B2 | 8/2010 | Roush |
| 7,837,254 B2 | 11/2010 | Reiman et al. |
| 7,887,120 B2 | 2/2011 | Boivin et al. |
| 7,938,475 B2 | 5/2011 | Boivin et al. |
| 7,942,466 B2 | 5/2011 | Reiman et al. |
| 7,942,467 B2 | 5/2011 | Boivin et al. |
| 7,942,468 B2 | 5/2011 | Boivin et al. |
| 7,942,469 B2 | 5/2011 | Boivin et al. |
| 7,942,470 B2 | 5/2011 | Boivin et al. |
| 7,942,471 B2 | 5/2011 | Boivin et al. |
| 7,950,721 B1 | 5/2011 | Peterson |
| 7,967,349 B2 | 6/2011 | Puppini et al. |
| 8,162,384 B2 | 4/2012 | Giromini et al. |
| 8,177,286 B2 | 5/2012 | Brown et al. |
| 8,398,150 B2 | 3/2013 | Brown et al. |
| 2003/0178611 A1 | 9/2003 | Anderson |
| 2005/0115776 A1 | 6/2005 | Doerflinger et al. |
| 2005/0161976 A1 | 7/2005 | Ortega et al. |
| 2006/0152038 A1 | 7/2006 | Graham |
| 2006/0182580 A1 | 8/2006 | Peterson |
| 2007/0114757 A1 | 5/2007 | Vickroy |
| 2007/0120397 A1 | 5/2007 | Layfield et al. |
| 2007/0176466 A1 | 8/2007 | Dolan et al. |
| 2008/0061597 A1 | 3/2008 | Reiman et al. |
| 2008/0061598 A1 | 3/2008 | Reiman et al. |
| 2008/0093887 A1 | 4/2008 | Wood |
| 2008/0116702 A1 | 5/2008 | Enz et al. |
| 2009/0189414 A1 | 7/2009 | Boivin et al. |
| 2009/0212595 A1 | 8/2009 | Heppel et al. |
| 2009/0212596 A1 | 8/2009 | Reiman et al. |
| 2009/0218848 A1 | 9/2009 | Boivin et al. |
| 2010/0096880 A1 | 4/2010 | Boivin et al. |
| 2010/0096881 A1 | 4/2010 | Boivin et al. |
| 2010/0096882 A1 | 4/2010 | Boivin et al. |
| 2010/0096883 A1 | 4/2010 | Boivin et al. |
| 2010/0098481 A1 | 4/2010 | Boivin et al. |
| 2010/0231000 A1 | 9/2010 | Andrus et al. |
| 2010/0264690 A1 | 10/2010 | Brown et al. |
| 2010/0264691 A1 | 10/2010 | Giromini et al. |
| 2011/0025092 A1 | 2/2011 | Reiman et al. |
| 2011/0062749 A1 | 3/2011 | Graham et al. |
| 2011/0148142 A1 | 6/2011 | Kint |
| 2011/0175396 A1 | 7/2011 | Boivin et al. |
| 2012/0169086 A1 | 7/2012 | Giromini et al. |
| 2012/0200113 A1 | 8/2012 | Brown et al. |

OTHER PUBLICATIONS

AeroFlex Fairing (TM) product info Page (1 page), Jul. 7, 2010.
AeroFlex Belly Fairing (TM) product info Page (2 pages), Jul. 7, 2010.
AeroFlex Low Rider Belly Fairing product info Page (1 page), Jul. 7, 2010.
AeroFlex Freight Wing chassis Belly Fairing product info Page (1 page), Jul. 7, 2010.
Trailer Fairings from http://www.laydoncomp.com/trailer-skirts.php (3 pages), Jul. 7, 2010.
Trailerskirt (TM) Assembly Instructions, Jun. 12, 2009 Rev. 8.0 supersedes all other version, LCL-ENG-045, (7 pages).
"MFS Skirt, Maximum Flex Skirt", Transtech Composite, (2 pages), undated material.
Side Skirt Fairing: Overview. "Aeroefficient-Aerodynamic Solution for the Trucking Industry", 2010 Aeroefficient (12 pages).
Truck Fuel Savings, Aerodynamic Fairing, Aerodynamic Parts, Truck Industry, "Windyne", (2 pages), Jul. 7, 2010.
Laydon Composites, Ltd. website, Trailer Skirt Catalog as existed on Feb. 7, 2009, accessed via the Internet Archive WayBack Machine on Oct. 3, 2011; found at http://web.srchive.org/web/20090207195226/http://www.laydoncomp.com/trailer-skirts.php.
2008 Product Catalog for Takler Srl (31 pages).
The International Search Report and the Written Opinion of the International Searching Authority for related International Application No. PCT/US2010/031173, dated Jun. 14, 2010 (13 pages).
Strehl Trailer Blade Brochure, "Trailer Blade (TM) Model 715 Advanced Aerodynamic Trailer Skirt", 5 pages 2009-2010.
Utility Brochure, "Innovative Side Skirt Designs From Utility", 2 pages 2010.
Office Action in U.S. Appl. No. 12/760,798 dated Oct. 13, 2011 (12 pages).
Office Action in U.S. Appl. No. 13/448,931 dated Jun. 29, 2012 (12 pages).
Dec. 12, 2011 letter from Albert L. Underhill Law Office, P.L.L.C. To Carli E. Stewart, Chief Patent Counsel, Wabash National, L.P. (2 pages).
Office action in U.S. Appl. No. 13/413,998 dated Jul. 10, 2012 (9 pages).
European Search Report for European Application No. 10765160.6, Mar. 18, 2013, 5 pages.

FOLDING SIDE SKIRT SYSTEM FOR A TRAILER

This application claims priority under 35 U.S.C. §119(e) to U.S. Provisional Patent Application Ser. No. 61/613,652 entitled FOLDING SIDE SKIRT SYSTEM FOR A TRAILER and filed Mar. 21, 2012, the entirety of which is hereby incorporated by reference herein.

FIELD OF THE INVENTION

The present invention relates generally to semi-trailers, such as van-type trailers, for example. In particular, the present invention relates to an aerodynamic side skirt system for reducing drag on such a trailer.

BACKGROUND OF THE INVENTION

To reduce wind flow resistance and drag on a trailer, truck, semitrailer, or other vehicle, side skirts have been used which extend downwardly from a bottom of the trailer and/or chassis toward the roadway to partially enclose the floor assembly and undercarriage. Typically, a side skirt for a trailer extends between the front landing gear and rear wheel assembly of the trailer.

Air flow passing under a ground vehicle imparts a drag force to the vehicle when it impinges on and flows around the vehicle undercarriage components attached to or part of the underside of a vehicle. Side skirt systems are designed to prevent or control the flow of air from entering the undercarriage region from the side of the ground vehicle, such as a trailer of a tractor-trailer truck system, for example. Such reduction on the drag of the ground vehicle may operate to conserve fossil fuels as well as other sources of vehicle drive power for hybrid vehicles, battery-operated vehicles, and alternative fuel-based vehicles, for example.

SUMMARY

The present invention may comprise one or more of the features recited in the attached claims, and/or one or more of the following features and combinations thereof.

According to one aspect of the present disclosure, a side skirt system for reducing drag on a trailer includes a side skirt wall configured to be coupled to one side of the trailer to extend generally below a storage container of the trailer at least partially along a length of the trailer. The side skirt wall includes a first wall panel having a first end configured to be pivotably coupled to a rear wheel assembly of the trailer. The side skirt wall also includes a second wall panel having a first end pivotably coupled to a second end of the first wall panel and a second end configured to be pivotably coupled to a rear portion of the trailer. Illustratively, the side skirt wall is movable between a fully-extended position wherein the first and second wall panels cooperate to define a generally planar side skirt wall and a fully-retracted position wherein the first and second wall panels are angled relative to each other.

In one illustrative embodiment, a front end of the front wall panel may be spaced a first distance from a rear end of the second wall panel when the side skirt wall is in the fully-extended position. Further, the front end of the front wall panel may be spaced a second, smaller distance away from the rear end of the rear wall panel when the side skirt wall is in the fully-retracted position.

In another illustrative embodiment, the side skirt wall may be angled relative to a sidewall of the trailer when the side skirt wall is in the fully-extended position. Illustratively, a rear end of the side skirt wall may be positioned inwardly of a front end of the side skirt wall.

In yet another illustrative embodiment, the side skirt system may also include a mounting bracket configured to be coupled to the rear wheel assembly of the trailer. Illustratively, the first wall panel may be pivotably coupled to the mounting bracket. Further illustratively, the mounting bracket may include a horizontal bar and a vertical post coupled to one end of the horizontal bar. The first end of the first wall panel may be pivotably coupled to the vertical post. Further, the vertical post of the mounting bracket may extend downwardly therefrom to define an axis about which the first wall panel pivots.

In still another illustrative embodiment, the first and second wall panels may each be made of a composite material including an outer skin, an inner skin, and a core positioned between and coupled to the first and second skins. Illustratively, the inner and outer skins may be metal and the core may be a polymer.

According to another aspect of the present disclosure, a side skirt system for reducing drag on a trailer includes a side skirt wall configured to be coupled to one side of the trailer to extend generally below a storage container of the trailer at least partially along a length of the trailer. The side skirt wall is movable between a full-extended position wherein the side skirt wall generally defines a straight line, and a fully-retracted position wherein a first distance between a front end and a rear end of the side skirt wall is less than a second distance between the front end and the rear end of the side skirt wall when the side skirt wall is in the fully-extended position.

In one illustrative embodiment, the front end of the side skirt wall may be configured to be coupled to a rear wheel assembly of the trailer for back-and-forth movement therewith. Illustratively, the rear end of the side skirt wall may be configured to be coupled to a rear portion of the trailer.

In another illustrative embodiment, the side skirt wall may include a plurality of wall panels. Illustratively, the wall panels may generally be aligned with each other when the side skirt wall is in the fully-extended position. Further, outer surfaces of two adjacent panels may be substantially facing each other when the side skirt wall is in the full-retracted position. Illustratively, side skirt wall may include a first wall panel and a second wall panel pivotably coupled to the first wall panel for pivoting movement relative thereto about a generally vertical axis. The vertical axis may move inwardly toward the longitudinal axis of the trailer when the side skirt system is moved from the fully-extended position to the fully-retracted position. Illustratively, the side skirt wall may also include a hinge coupled to and positioned between the first and second wall panels.

According to still another aspect of the present disclosure, a trailer and side skirt system for reducing drag on a trailer includes a trailer having sidewalls, a floor assembly, a rear bumper coupled to and extending downwardly from the floor assembly, and a rear wheel assembly coupled to the floor assembly. Illustratively, the wheel assembly is movable relative to the floor assembly between a first, forward position wherein the rear wheel assembly is spaced a first distance away from the rear bumper and a second, rearward position wherein the rear wheel assembly is spaced a second distance smaller than the first distance away from the rear bumper. A side skirt system is coupled to the trailer and extends downwardly below the floor assembly of the trailer at least partially along a length of the trailer between the rear wheel assembly and the rear bumper of the trailer. Illustratively, a front end of the side skirt system is configured to move back-and-forth with the rear wheel assembly relative to the floor assembly. Further illustratively, a rear end of the side skirt system is configured to remain generally stationary relative to the floor assembly.

In one illustrative embodiment, the side skirt system may include a plurality of wall panels pivotably coupled to one another. Illustratively, the plurality of wall panels may include a first wall panel pivotably coupled to the rear wheel assembly and a second wall panel pivotably coupled at a first end to the first wall panel and at a second end to at least one of the rear bumper, a rear end portion of a slide rail, a rear end portion of a rear end wall, and a rear end portion of the sidewall of the trailer.

In another illustrative embodiment, the side skirt wall may define a plane generally angled relative to a plane defined by the sidewall of the trailer when the side skirt system is in the fully-extended position. Illustratively, a rear end of the skirt wall may be positioned inwardly relative to the trailer from a front end of the skirt wall.

In yet another illustrative embodiment, the trailer and side skirt wall system may also include a mounting bracket coupled to the rear wheel assembly. Illustratively, the front wall panel of the side skirt wall may be pivotably coupled to the mounting bracket.

In still another illustrative embodiment, the trailer and side skirt system may also include a rear bumper deflector for reducing drag on the trailer. The rear bumper deflector may define a horizontally planar body coupled to the rear bumper of the trailer at a location spaced apart from the floor assembly of the trailer. Further illustratively, the rear bumper deflector may extend forwardly from the rear bumper toward the rear wheel assembly. Further still, the rear bumper deflector may be positioned outwardly from the rear end of the side skirt system.

According to still another aspect of the present disclosure, a rear bumper deflector for reducing drag on a trailer includes a planar body configured to be coupled to an outer end of a horizontal member of a rear bumper of the trailer. Illustratively, the planar body extends forwardly from the horizontal member toward a forward end of the trailer.

BRIEF DESCRIPTION OF THE DRAWINGS

FIG. 3 is a bottom view of a portion of the trailer showing the side skirt system in the fully-opened position.

FIG. 4 is a bottom view of the trailer similar to FIG. 3 showing the side skirt system in a partially closed position as a rear wheel assembly of the trailer is moved toward a rear bumper of the trailer.

FIG. 5 is a bottom view similar to FIGS. 3 and 4 showing the side skirt system having been moved farther toward the fully-closed position as the rear wheel assembly of the trailer is moved closer toward the rear bumper of the trailer.

FIG. 6 is a bottom view similar to FIGS. 3-5 showing the side skirt system in the fully-closed position.

DETAILED DESCRIPTION OF THE PREFERRED EMBODIMENT

For the purposes of promoting an understanding of the principles of the invention, reference will now be made to illustrative embodiments shown in the attached drawings and specific language will be used to describe the same. While the concepts of this disclosure are described in relation to a truck trailer, it will be understood that they are equally applicable to other vehicles generally, and more specifically to conventional flat-bed and/or box or van type trailers, examples of which include, but should not be limited to, straight truck bodies, small personal and/or commercial trailers and the like. Accordingly, those skilled in the art will appreciate that the present invention may be implemented in a number of different applications and embodiments and is not specifically limited in its application to the particular embodiments depicted herein.

Figure 1:
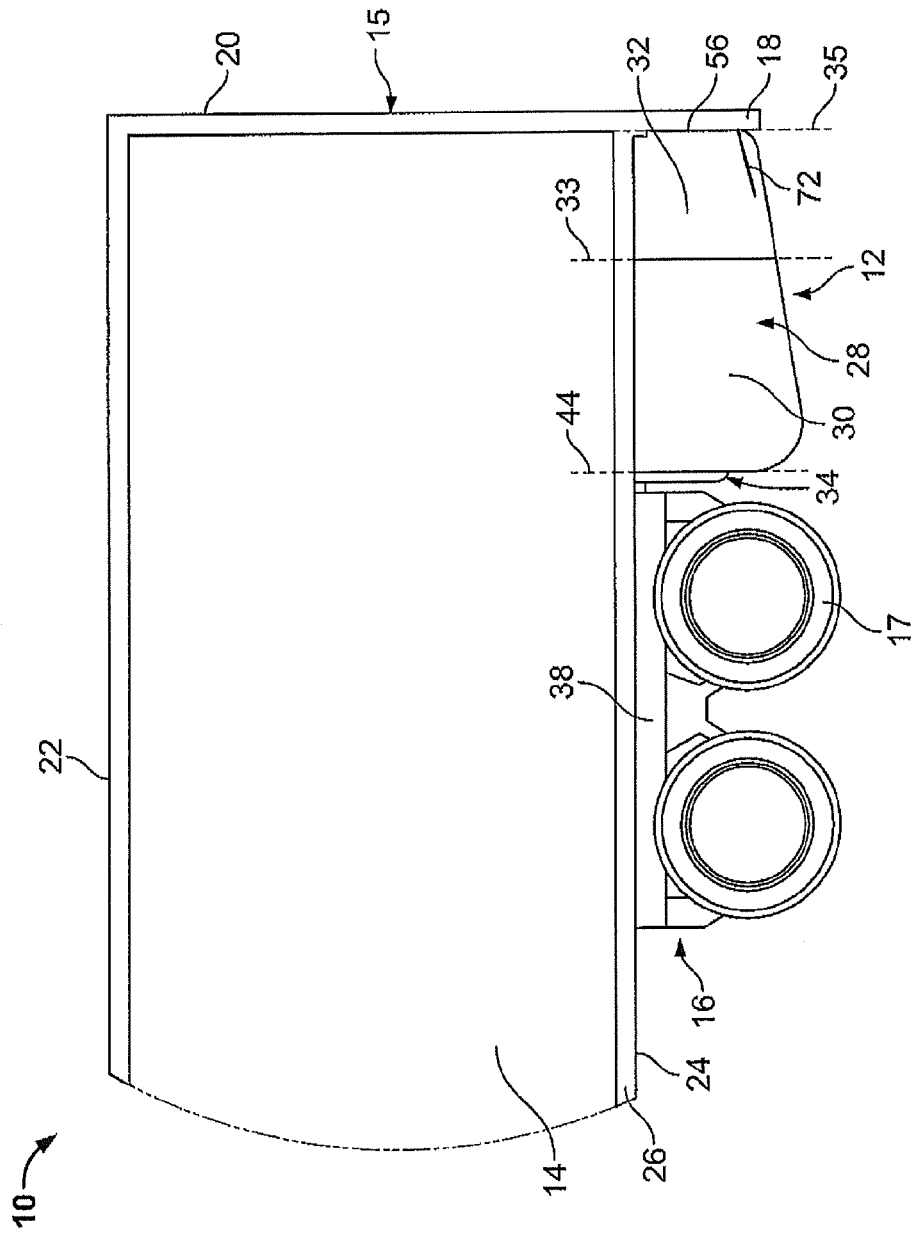
FIG. 1 is a side view of a portion of a trailer and a side skirt system of the present disclosure coupled to the trailer, and showing the system in a fully-opened position.
Figure 2:
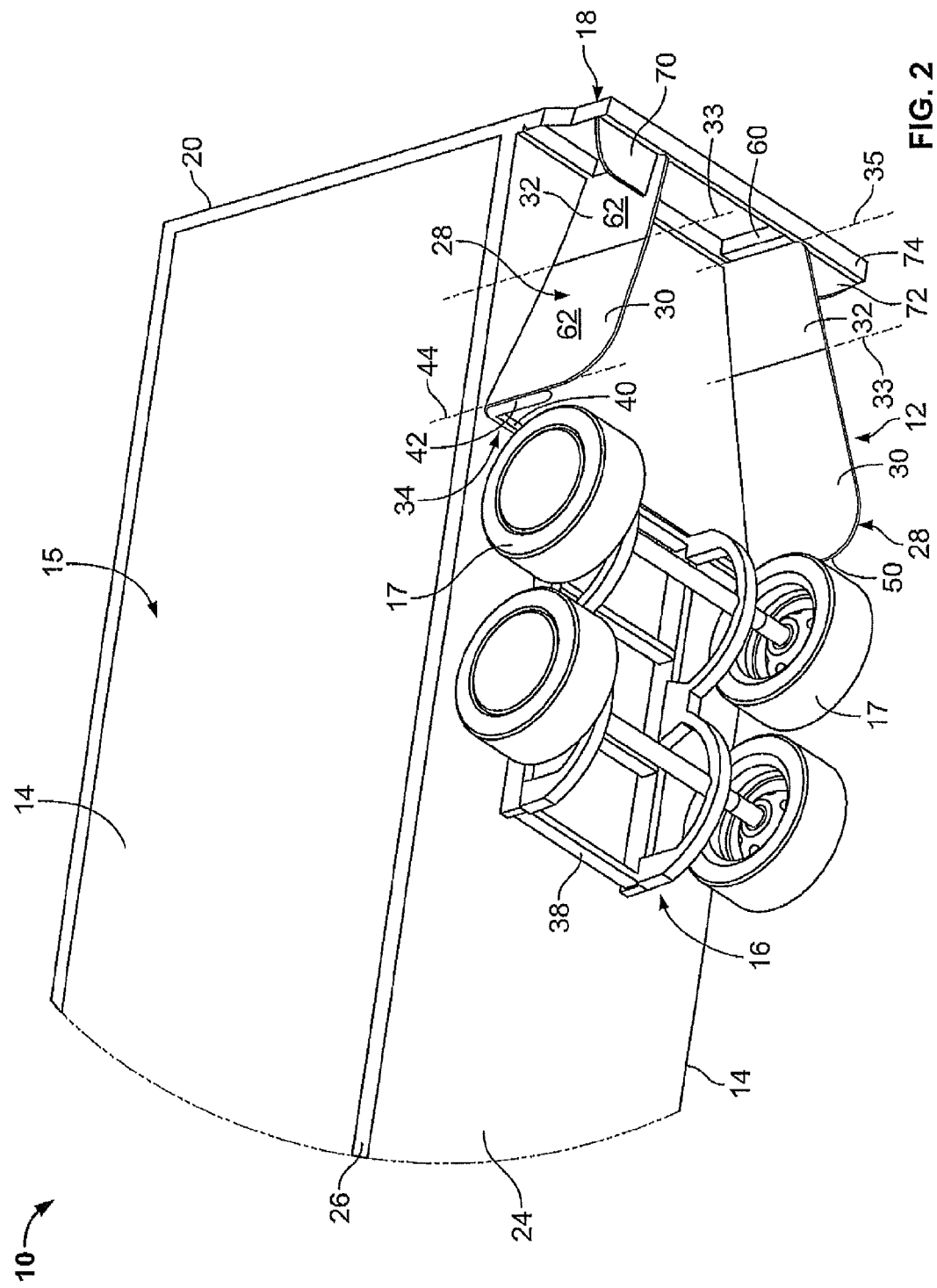
FIG. 2 is a rear, perspective view of a portion of the trailer showing the side skirt system of FIG. 1 in the fully-opened position.

Looking first to FIGS. 1 and 2, a trailer 10 includes an aerodynamic skirt system 12 coupled to and extending downwardly from each sidewall 14 of the trailer 10. Illustratively, the skirt system 12 operates to improve the aerodynamic efficiency of the trailer 10 by reducing drag and wind flow under the sides of a rear end portion of the trailer 10. In particular, the skirt system 12 operates to reduce airflow under the rear end of the trailer 10 while the trailer 10 is traveling down the road. This reduction of airflow under the trailer 10 may increase the fuel efficiency, or the efficiency of any other such source of vehicle drive power, of the tractor/trailer combination. Illustratively, the skirt system 12 extends below a sidewall 14 of the trailer 10 at least partially along a length of the trailer 10. In particular, as is discussed in detail below, the skirt system 12 extends generally between a rear wheel assembly, or bogie, 16 of the trailer 10 and a rear bumper, or rear underride guard, 18 of the trailer 10. Illustratively, as noted below, the skirt system 12 may be mounted to any suitable mounting structure located at a rear end portion of the trailer 10. Thus, the skirt system 12 is located generally along the side of trailer 10 the at a rear end portion of the trailer 10. As is further discussed in additional detail below, the skirt system 12 is movable with the rear wheel assembly 16 between a fully-opened, or extended, position and a fully-closed, or retracted, position.

As shown in FIGS. 1 and 2, the trailer 10 includes a storage container 15 configured to carry cargo therein. The storage container 15 includes sidewalls 14, a front end wall (not shown), a rear end wall 20, a roof 22, and a floor assembly 24 which all cooperate together to define an inside storage portion (not shown) of the container 15 able to store various articles or goods therein. The trailer 10 further includes the rear wheel assembly, or bogie, 16 and a front support or landing gear (not shown) each coupled to the floor assembly 24 of the trailer 10. Illustratively, the floor assembly 24 of the trailer 10 includes various laterally-extending cross members (not shown) and right and left base rails 26. The front end of the trailer 10 is configured to be coupled to a tractor (not shown) for towing the trailer 10 thereon thus providing a tractor-trailer assembly. It should be understood that while the aerodynamic side skirt system 12 is shown for use with a trailer 10, the side skirt system 12 may be coupled to any vehicle to reduce the drag thereon. As shown in FIG. 1, the side skirt system 12 is positioned between the rear wheel assembly 16 and the rear bumper 18 in order to prevent air from flowing laterally under the rear portion of the floor assembly 24 of the trailer 10 as the trailer 10 is towed by a tractor.

Illustratively, the trailer 10 includes two aerodynamic rear skirt systems 12, as shown in FIG. 2. In particular, one system 12 is coupled one side of the storage container 15 of the trailer 10 to extend downwardly from the floor assembly 24 adjacent a first sidewall 14, while the other system 12 is coupled to the other side of the storage container 15 to extend downwardly from the floor assembly 24 adjacent a second sidewall 14. For purposes of the description herein, however, only one skirt system 12 will be described herein. However, it should be understood that the two skirt systems 12 of the trailer 10 are identical in configuration and function.

As shown in FIGS. 1 and 2, the skirt system 12 includes a side skirt wall 28 having two wall panels. In particular, the side skirt wall 28 includes a front panel 30 and a rear panel 32 pivotably coupled to the front panel 30. Illustratively, the front and rear panels 30, 32 of the wall 28 are hingedly coupled to each other via a hinge (not shown). The hinge may be any suitable hinge to allow for pivotable movement of the front panel 30 relative to the rear panel 32 such as, but not limited to, a butt hinge, a butterfly hinge, a living hinge, etc., in order to allow the front and rear panels 30, 32 to hingedly move relative to each other along a pivot axis 33 defined by the hinge.

Figure 3:
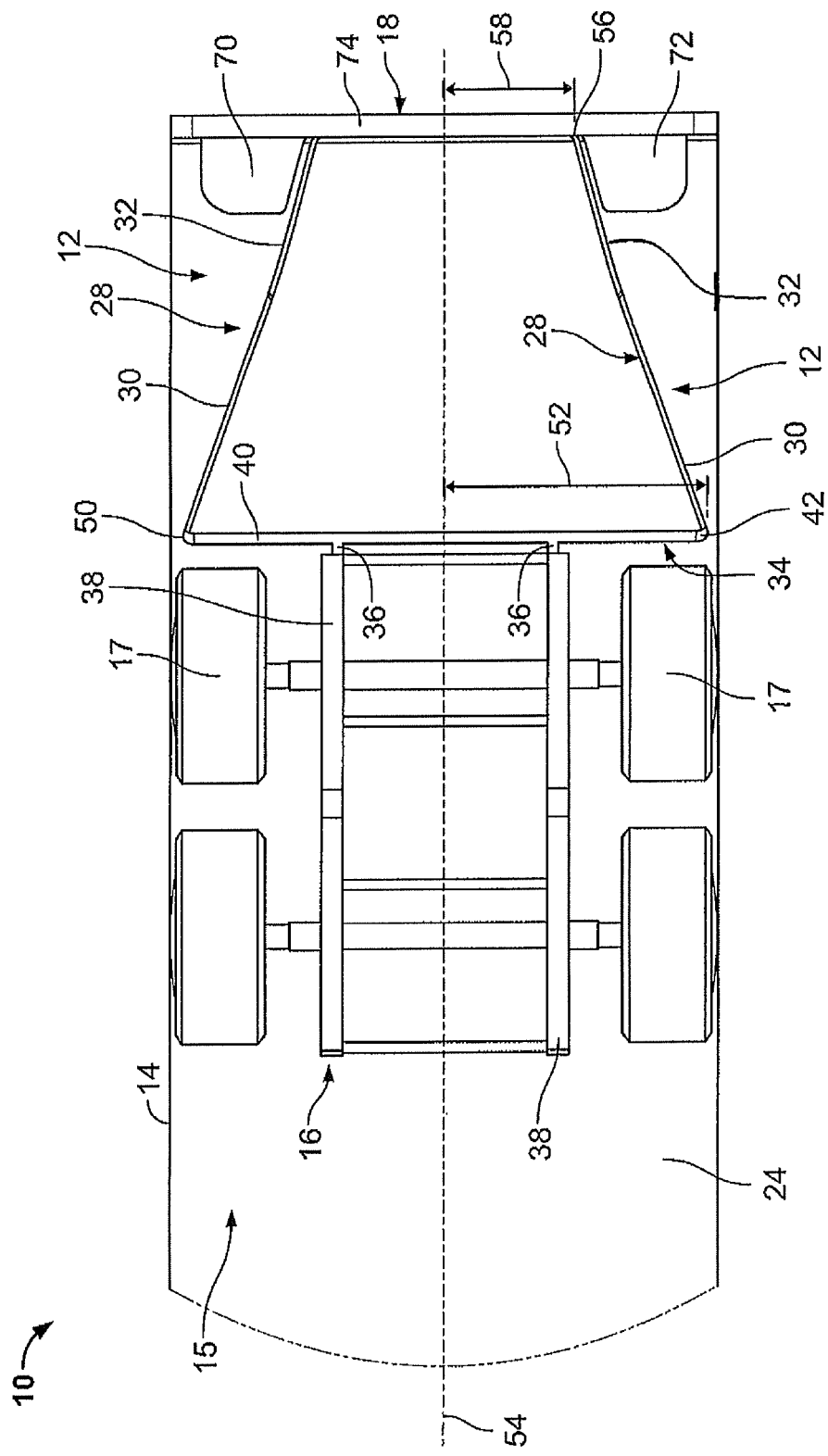
FIGS. 3-6 are bottom views of a portion of the trailer including the side skirt system of FIGS. 1 and 2 showing the side skirt system moving between the fully-opened position (shown in FIG. 3) and a fully-closed position (shown in FIGS. 6 and 7).

As shown in FIGS. 1 and 2, the front panel 30 is coupled to the rear wheel assembly 16 of the trailer 10. The front wall panel 30 is secured to the rear wheel assembly 16 by a mounting bracket 34. As shown in FIG. 3, the mounting bracket 34 includes first and second arms 36 which are coupled to a rear portion of a frame 38 of the rear wheel assembly 16. Each arm 36 may be welded or otherwise rigidly secured to the rear end of the frame 38 such that the bracket 34 extends rearwardy from the frame 38, as shown in FIGS. 3-6. The mounting bracket 34 further includes a transversely extending body 40 coupled to each of the arms 36 and a post 42 coupled to each end of the body 40. Illustratively, each post 42 extends downwardly from each respective end of the body 40, as shown in FIG. 2. As shown in FIGS. 2 and 3-6, the outer ends of the transversely-extending body 40 are positioned adjacent to and rearward of the rear wheels 17 of the rear wheel assembly 16 and adjacent, but inward and spaced from the sidewalls 14 of the trailer 10. Illustratively, the front panel 30 of one of the side skirt systems 12 is coupled to one of the downwardly-extending posts 42 of the bracket 34 while the front panel 30 of the other one of the side skirt systems 12 is coupled to the other one of the downwardly-extending posts 42 of the bracket 34. While one bracket 34 is provided herein for coupling to both side skirt systems 12, it is within the scope of this disclosure to provide two separate mounting brackets each coupled to the frame 38 of the rear wheel assembly 16 and to one of the side skirt systems 12. Further, while the particular mounting bracket 34 including the two arms 36, the transverse body 40, and the downwardly-extending posts 42 is shown herein, it is also within the scope of this disclosure to provide any suitable mounting bracket configured to couple the front panel 30 of one or both skirt systems 12 to the rear end of the rear wheel assembly 16.

As is discussed in greater detail below, the front panel 30 is pivotably coupled to the downwardly-extending post 42 to allow the front panel 30 to pivot about an axis relative to the mounting bracket 34 and to the wheel assembly 16 during movement of the side skirt system 12 between the fully-opened position and the fully-closed position. As shown in FIG. 2, for example, the front end 50 of the front panel 30 is hingedly coupled to the post 42 along a length of the post 42 to pivot about a vertical axis 44. The hinge (not shown) coupling the front panel 30 to the mounting bracket 34 may be any suitable hinge to allow for pivotable movement of the front panel 30 relative to the mounting bracket 34 such as, but not limited to, a butt hinge, a butterfly hinge, a living hinge, etc. Further illustratively, it is within the scope of the disclosure to include a mounting bracket which does not have any downwardly-extending post, such as post 42, to which the front skirt panel 30 is coupled. In this alternative embodiment, the skirt panel 30 may include a stiffener attached thereto such that a single hinge coupling a top of the skirt panel 30 to the transversely-extending body 40 of the illustrative mounting bracket 34, or to another portion of an alternative mounting bracket, for example, may be provided.

In operating the trailer, the rear wheel assembly 16 is oftentimes moved rearward in close proximity to the rear bumper 18 during cargo loading and unloading of the storage container 15 of the trailer 10. As such, a distance between the rear wheel assembly 16 and the rear bumper 18 is not fixed. Rather, such a distance is variable depending upon whether the trailer 10 is configured for road travel, for example, or whether the trailer 10 is configured for loading and unloading of cargo. As noted above, the side skirt system 12 is positioned between the rear wheel assembly 16 and the rear bumper 18.

As is discussed in greater detail below, the mounting bracket 34 is configured to couple the front wall 30 of the skirt system 12 to the rear wheel assembly 16 of the trailer 10 for back and forth movement of the skirt system 12 with the rear wheel assembly 16. Furthermore, the mounting bracket 34 is allows the front wall 30 of the skirt system 12 to pivot relative to the rear wheel assembly 16 during back and forth movement of the rear wheel assembly 16 relative to the floor assembly 24 of the trailer 10 such that the side skirt system 12 is able to retract and fold when the rear wheel assembly 16 is moved rearwardly. Thus, the ability of the side skirt system to move between a first, extended, or fully-opened, position and a second, retracted, or fully-closed, position allows for an aerodynamic drag reduction to be provided when the rear wheel assembly 16 is in the forward, or highway, position while still allowing the rear wheel assembly 16 to be moved to the rearward, or cargo loading/unloading position without interference from the side skirt system 12.

Illustratively, each wall panel 30, 32 is made of a composite material. For example, the composite material may include a plastic core and metal outer skins coupled to the plastic core. Such a composite material provides a rigid, but lightweight and durable material. Illustratively, for example, each wall panel 30, 32 may be made of a DURAPLATE® composite panel provided by Wabash National Corporation of Lafayette, Ind. DURAPLATE® composite panels are constructed of a high-density polyethylene plastic core bonded between two high-strength steel skins.

The inner and outer skins respectively may be formed of a metal or metallic composition, examples of which include, but should not be limited to aluminum, galvanized steel, full hardened steel, such as AISI Grade E steel, or the like. In one illustrative embodiment, for example, the outer skin is formed of ASTM G90 galvanized steel, and the inner skin is formed o ASTM G40 galvanized steel. In alternative embodiments, the inner and/or outer skins respective may be formed of other rigid, semi-rigid, metallic or non-metallic materials. Illustratively, the composite material (i.e., panels 30, 32) is approximately between 0.08 inch and 0.20 inch thick, with a preferred thickness of approximately 0.10 inch thick. While the illustrative panels 30, 32 disclosed herein are each made of the particular composite material described above, it should be understood that other suitable composite materials may be used as well. For example, the panels 30, 32 may also be made from a plastic pultrusion with fiber reinforcements embedded inside the polymer material. The reinforcement fibers may be made from glass, carbon, and/or other suitable materials, for example.

It should be further understood that while the illustrative panels 30, 32 disclosed herein are made from a composite, the panels 30, 32 may alternatively be formed from a non composite material such as a sheet made from a metal, metal alloy, or plastic, for example. The panels 30, 32 may be made from ferrous or nonferrous materials including plastics or composites incorporating a combination of ferrous and/or nonferrous materials thereof. In particular, an alternative panel (not shown) may be made from galvanized steel. Of course, it is within the scope of this disclosure to include non-galvanized steel sheets, or other such non-composite panels, of any suitable thickness as well. Further, while the panels 30, 32 are generally smooth, it should be understood that such roof panels may be configured to have corrugations formed therein as well.

Illustratively, the skirt system 12 may further include a flexible flap (not shown) coupled to the bottom edge of the wall panels 30, 32 in the same or similar manner as that which is shown and described in U.S. Pat. No. 8,177,286, the entirety of which is hereby incorporated by reference herein. Illustratively, the flexible flap may be made of plastic or other suitable materials. The flexible flap operates to resist airflow and may prevent damage to the skirt walls 30, 32 from forces applied vertically such as in situations where the trailer 10 may traverse over a curb or railroad track where the road surface is not flat. In such instances, for example, the flap is configured to bend, or flex, to prevent damage to the skirt wall 30, 32 to which it is attached. Illustratively, a single flap may be coupled to each wall panel 30, 32. However, it is within this disclosure to include a single, unitary flap coupled to both wall panels 30, 32. Further illustratively, the wall panels 30, 32 make up approximately 70% of the total height of the skirt wall 28 while the flap may make up approximately the lower 30% of the total height of the skirt wall 28. Of course, it is within this disclosure to include wall panels and/or flaps having other suitable heights as well in order to allow the flap to bend in circumstances where the side skirt assembly engages a raised object as the trailer is being towed.

Illustratively, the skirt wall 28 described herein does not tilt outwardly or inwardly. However, it is within the scope of this disclosure to provide a skirt wall that tilts outwardly and inwardly. Such a skirt wall may tilt outwardly and inwardly as a single unit. Alternatively, the panels 30, 32 may be able to tilt laterally both inwardly and outwardly generally independently of each other.

Illustratively, the sides skirt systems 12 disclosed herein include skirt walls 30, 32 which are angled with respect to the sidewalls 14 of the trailer 10. In particular, as shown in FIG. 3, a front end 50 of the front skirt wall 30 is positioned a distance 52 from a centerline, or longitudinal axis, 54 of the trailer 10 when the side skirt system 12 is in the fully-opened position. A rear end 56 of the rear skirt wall 32, however, is positioned a distance 58 from the longitudinal axis 54 of the trailer 10 when the skirt system 12 is in the fully-opened position. The distance 58 of the rear end 56 from the longitudinal axis 54 is smaller than the distance 52 of the front end 50 from the longitudinal axis 54. In other words, the front end 50 of the skirt system 12 is positioned farther away from the longitudinal axis than the rear end 56 of the skirt assembly such that the skirt system 12 angles inwardly toward the longitudinal axis from the front end 50 toward the rear end 56 of the system 12. Thus, the side skirt wall 28 of each system 12 is angled with respect to the sidewalls 14 of the trailer 10 when the trailer 10 is viewed from above or below in a plan view, for example. In particular, the right and left rear wall panels 32 are positioned inwardly from the sidewalls 14 of the trailer 10 to mount the rear end 56 of each skirt wall 28 directly to or adjacent to vertical posts 60 of the rear bumper 18. Illustratively, the rear 56 end of the rear panel 32 is hingedly coupled to the post 60 along a length of the post 60 to pivot about a vertical axis 35. The hinge (not shown) coupling the rear panel 32 to the post 60 may be any suitable hinge to allow for pivotable movement of the rear panel 32 relative to the post 60 such as, but not limited to, a butt hinge, a butterfly hinge, a living hinge, etc. The front end 50 of the skirt wall 28 is positioned inward and adjacent the respective sidewall 14, as shown in FIG. 2. Thus, the front end 50 of the skirt wall 28 is spaced a smaller distance from the adjacent sidewall 14 than the rear end 56 of the skirt wall 28. As such, the skirt wall 28 is angled inwardly from a vertical plane defined by the front end 50 of the skirt wall 28 to the rear end 56 of the skirt wall 28. It is also within the scope of this disclosure to include a side skirt system including skirt walls which are generally parallel to the sidewalls of the trailer. Further, it is within the scope of this disclosure to angle each skirt wall outwardly from the front end of the skirt wall toward the rear end of the skirt wall such that the rear end of the skirt wall is mounted to the trailer 10 at a location inward from and adjacent to from the sidewalls of the trailer and the front end is spaced a greater distance from the sidewalls than the rear end of the skirt wall.

Figure 6:
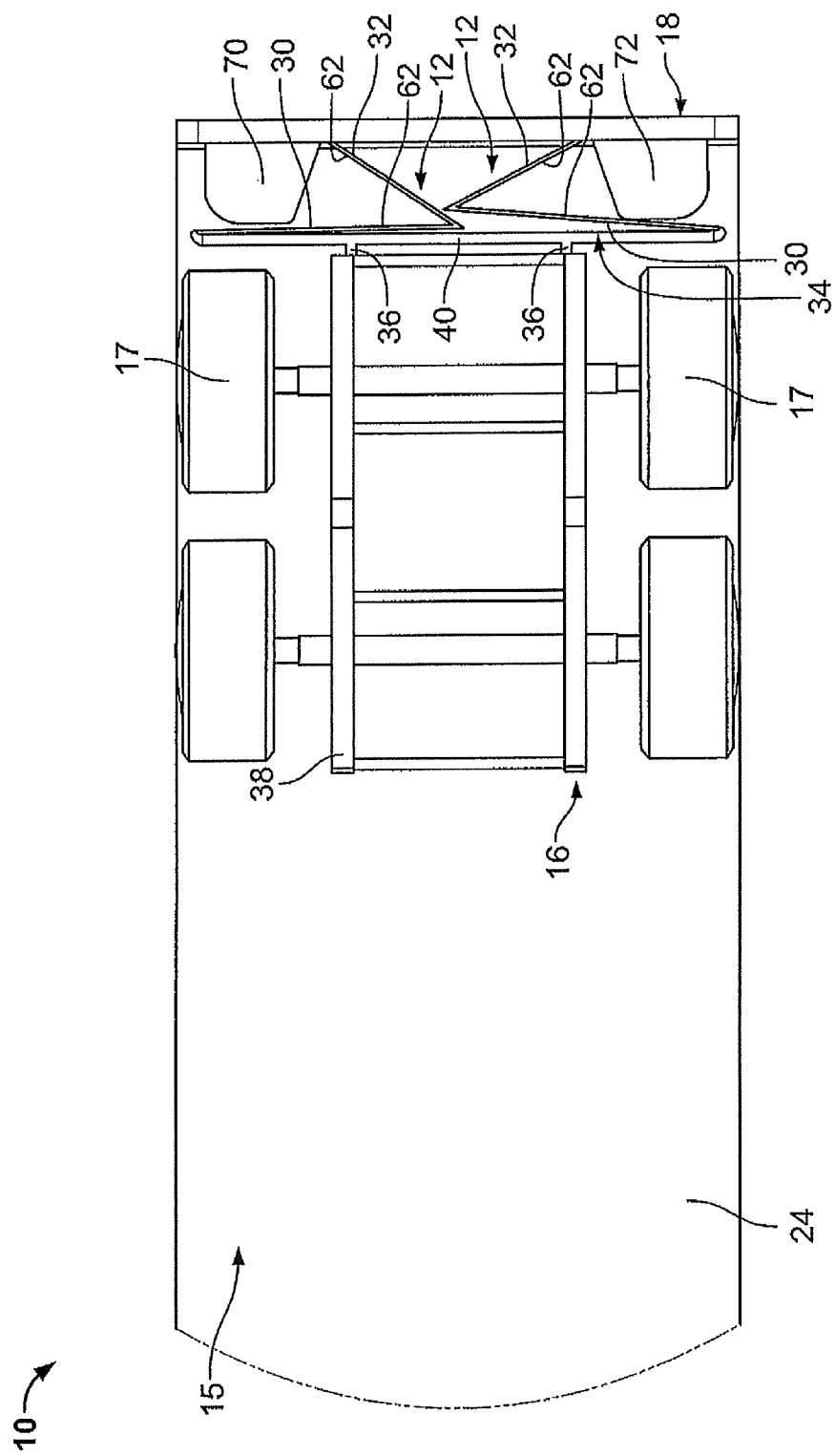
Figure 7:
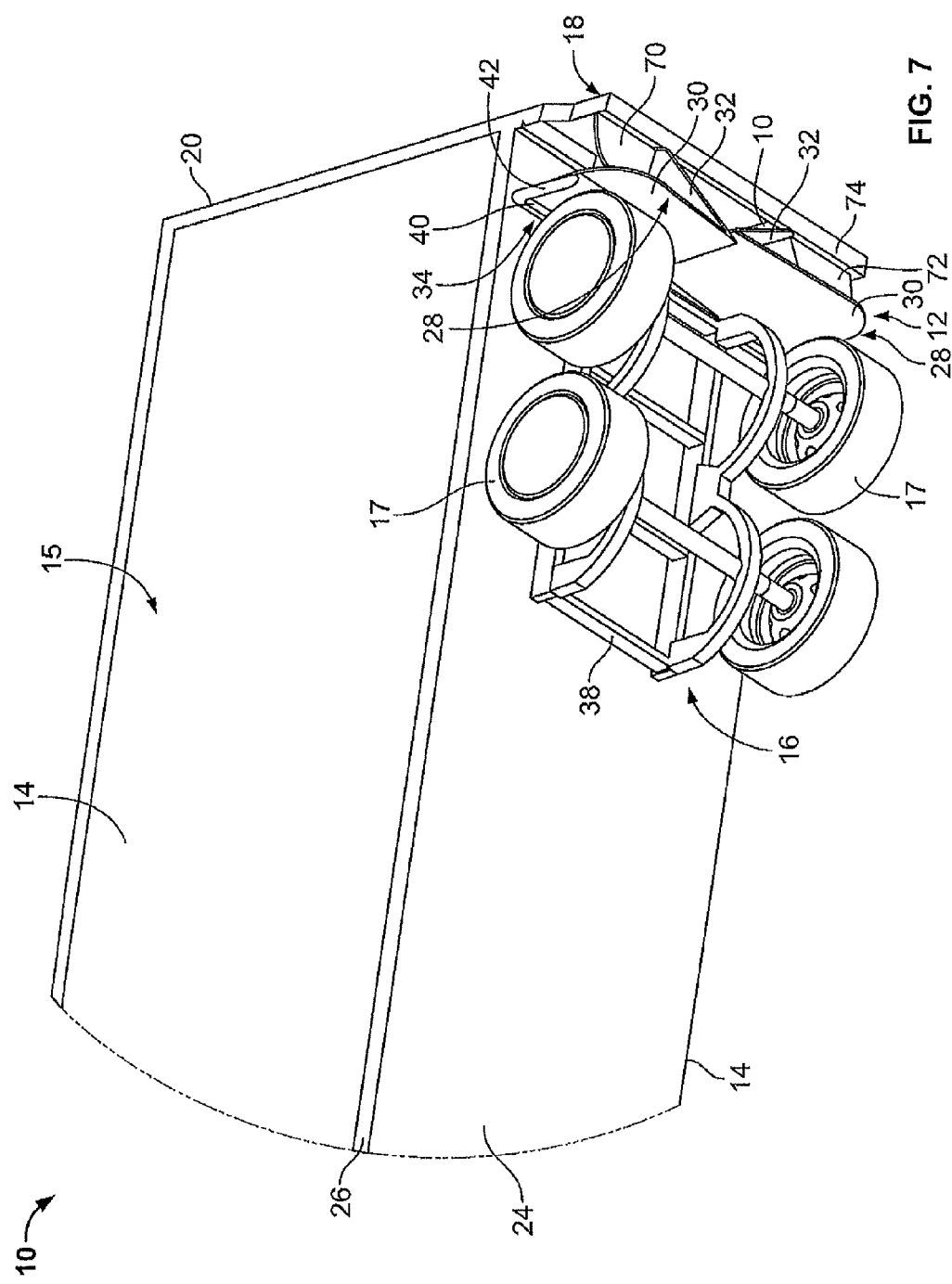
FIG. 7 is a rear, perspective view of a portion of the trailer showing the side skirt system in the fully-closed position.

In use, as noted above, the side skirt system 12 is configured to be moved between a fully-opened position shown in FIGS. 1-3 and a fully-closed position shown in FIGS. 6 and 7. Illustratively, the front end 50 of the front wall panel 30 is pivotably coupled to the frame 38 of the rear wheel assembly 16 via the mounting bracket 34 while the rear end 56 of the rear wall panel 32 is pivotably coupled to the post 60 of the bumper 18. Further, the front and rear wall panels 30, 32 are hingedly coupled to each other and are thus able to pivot relative to each other at the joint or connection point between the two panels 30, 32 about the vertical axis 33. As noted above, the rear wheel assembly 16 is configured to move back and forth relative to the storage container of the trailer along the longitudinal axis 54 of the trailer 10. The rear wheel assembly 16 is movable between the first, forward (or highway) position shown in FIGS. 1-3 where the rear wheel assembly 16 is positioned to allow the trailer 10 to be towed behind a tractor for highway travel, and the second, rearward (or cargo-loading) position shown in FIGS. 6 and 7 where the rear wheel assembly is positioned near the rear bumper 18 of the trailer 10. The second, rearward position is oftentimes preferred during loading and unloading of cargo within the storage container 15 of the trailer 10. Illustratively, the skirt system 12 provides for aerodynamic drag reduction when in the fully-opened position and the rear wheel assembly 16 is in the highway position, and is able to be moved with the rear wheel assembly 16 to the fully-closed position as the rear wheel assembly 16 is moved to the cargo-loading/unloading position.

In the fully-opened position, as shown in FIGS. 1-3, the front and rear wall panels 30, 32 are generally aligned with each other to define a generally straight, or planar, wall 28. As noted above, the skirt system 12 is angled with respect to the sidewall 14 of the trailer 10. Illustratively, the angle between the sidewall 14 of the trailer 10 and the skirt system 12 is approximately 35 degrees. However, it should be understood that the skirt system 12 may be angled relative to the sidewall 14 of the trailer 10 by any suitable amount.

In use, when the rear wheel assembly 16 is in the first, forward (or highway) position, the skirt system 12 is in the fully-opened position in order to provide aerodynamic drag reduction for the trailer 10 by substantially preventing the flow of air from entering the undercarriage region of the trailer 10 from the side of the trailer 10 where the skirt system 12 is located. This reduction on the drag of the trailer 10 may operate to conserve fossil fuels used to drive the tractor (not shown) towing the trailer 10. In the fully-opened position, the side skirt system 12 operates to control the flow of air between the rear wheel assembly 16 and the rear bumper 18 in order to substantially prevent air from entering the undercarriage region of the trailer 10 in the area between the rear wheel assembly 16 and the rear bumper 18. It should be understood that while a trailer 10 including only the side skirt system positioned rearward of the rear wheel assembly 16 is shown and described herein, that this skirt system 12 may be used in addition to other side skirt systems which may extend at least partially between the landing gear of the trailer 10 and the rear wheel assembly 16 as well. Further, other aerodynamic structures or assemblies, such as, but not limited to rear fairings or aerodynamic tails, may also be used with the side skirt systems 12 disclosed herein in order to further increase the fuel efficiency of the trailer 10.

Figure 4:
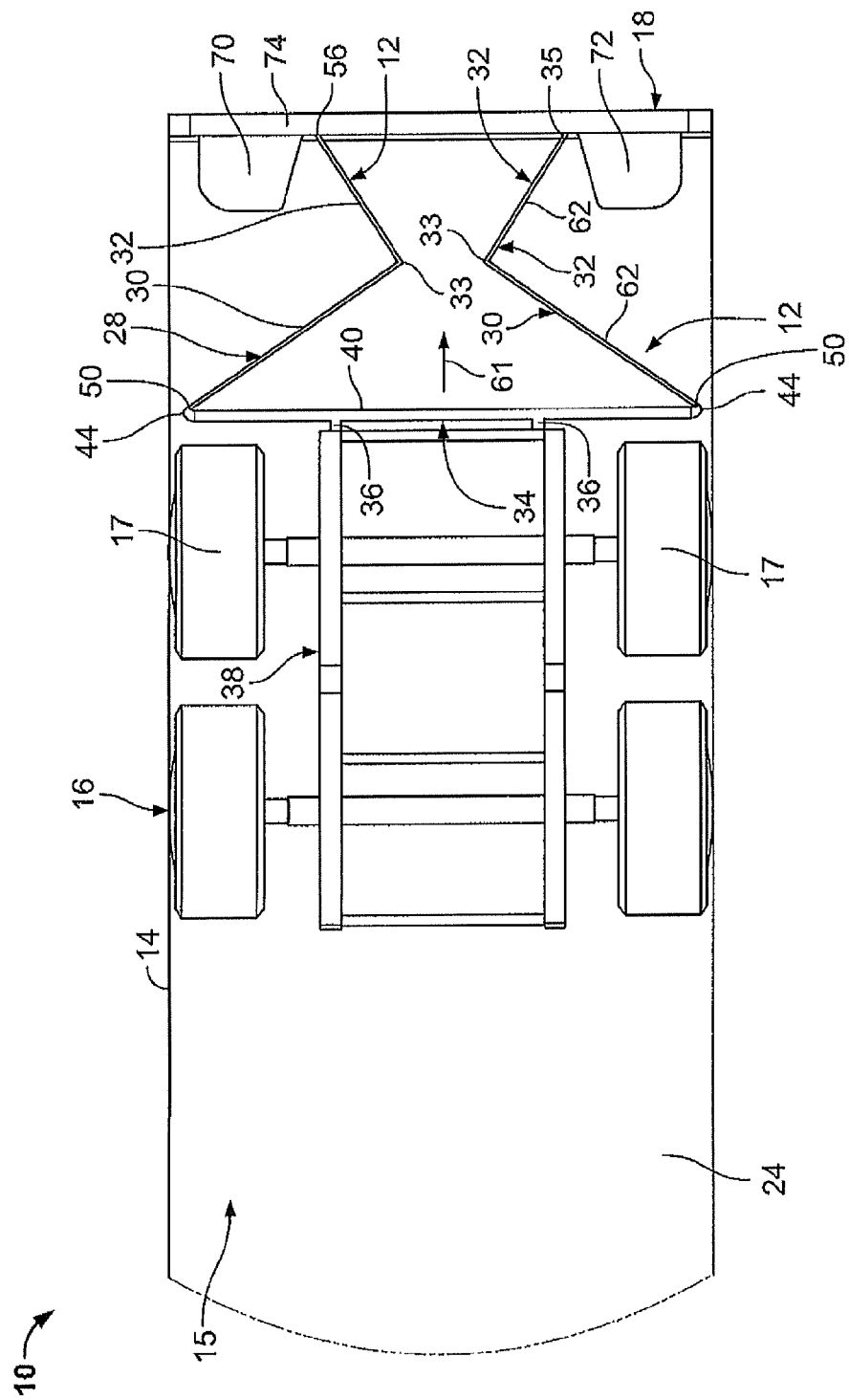
Figure 5:
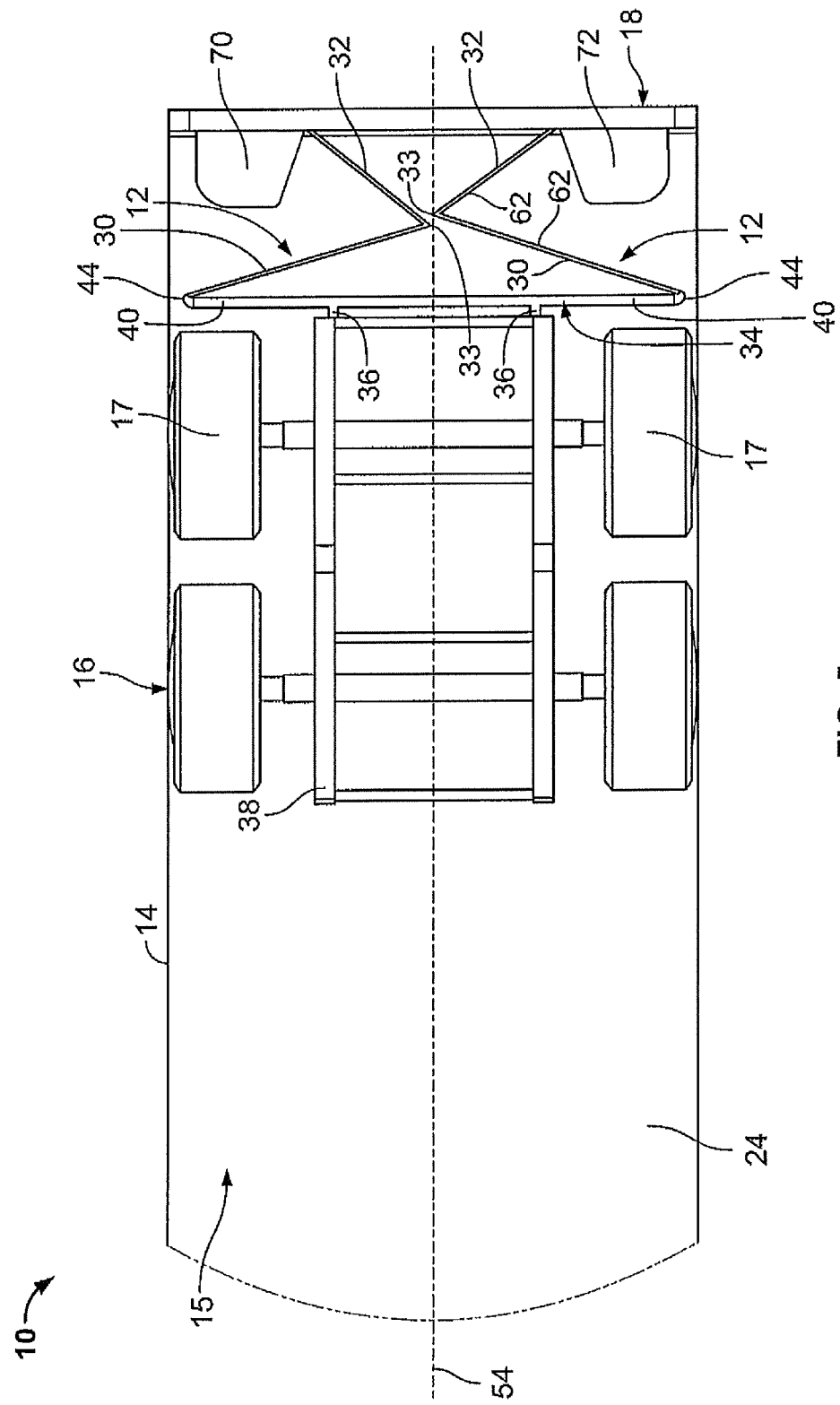

In order to move the side skirt system 12 to the second, rearward position, the user moves the rear wheel assembly 16 rearwardly, as illustrated by the arrow 61 in FIGS. 4 and 5. As the rear wheel assembly 16 is moved rearwardly relative to the storage container 15 of the trailer 10, the front and rear wall panels 30, 32 of the skirt system 12 are configured to pivot both relative to each other and relative to the rear wheel assembly 16 and rear bumper 18 to which they are attached. As shown in FIGS. 4-6, for example, as the rear wheel assembly 16 is moved rearwardly toward the rear bumper 18, the front and rear panels 30, 32 begin to fold inwardly such that the hinged joint connection defining the axis 33 between the front and rear panel 30, 32 moves inwardly toward the longitudinal axis 54 of the trailer 10. The front panel 30 also pivots about axis 44 relative to the mounting bracket 34 while the rear panel 32 also pivots about the axis 35 relative to the rear bumper 18. Accordingly, the outside surfaces 62 of each of the front and rear panels 30, 32 move toward each other as the panels 30, 32 are moved toward the fully-closed position shown in FIGS. 6 and 7. Illustratively, it should be understood that while the rear panel 32 is pivotably coupled to the rear bumper 18, it is within the scope of this disclosure for the rear panel 32 to be coupled to any other suitable structure of the trailer 10 that is rearward of the rear wheel assembly 16 including, but not limited to, a rear end of a slide rail (not shown) upon which the rear wheel assembly 16 is moved, a rear end portion of the floor assembly 24, a rear end portion of the sidewall 14 of the trailer 10, a portion of the rear end wall 20 of the trailer 10, and/or any suitable mounting structure rearward of the rear wheel assembly 16, for example.

In the fully-closed position, the outside surfaces 62 of each of the panels 30, 32 are generally facing and adjacent each other. Though, as shown in FIGS. 6 and 7, the panels 30, 32 are not parallel to each other when in the fully-closed position, it should be understood that the skirt system 12 may be moved to a closed, or retracted, position wherein the panels 30, 32 are substantially parallel to each other. In the fully-closed position, the skirt system 12 provides little to no aerodynamic efficiencies for the trailer 10. However, by moving to the skirt system 12 to fully-closed position, the rear wheel assembly 16 is also moved to its cargo-loading/unloading position to allow a user to load and unload cargo to the trailer 10. Therefore, in operation, the skirt system 12 generally does not interfere with the normal operation or movement of the rear wheel assembly 16 between the forward, highway position and the rearward, cargo loading position. The front end of the skirt system 12 simply moves with the rear wheel assembly 16 as the operator moves the rear wheel assembly 16 to its desired location. In other words, there is no need to separately adjust, move, fold, remove, or retract the side skirt system 12 when it is desired to move the rear wheel assembly 16 to the cargo loading position, for example.

Once the cargo has been loaded onto or unloaded from the storage container 15 of the trailer 10, the user may move the rear wheel assembly 16 to the highway position in a direction toward the front end of the trailer 10. As the rear wheel assembly 16 is moved back to the highway position (shown in FIGS. 1-3), the skirt system 12 coupled thereto is similarly moved to the fully-opened position in order to provide aerodynamic efficiencies to the trailer 10 as the trailer 10 is towed along the highway, for example. In particular, as the rear wheel assembly 16 is moved forwardly, the front end of the front wall panel 30 of the skirt system 12 is moved forwardly with the mounting bracket 34 on the rear wheel assembly 16. Thus, the skirt system 12 is unfolded such that the front and rear wall portions 30, 32 define a generally straight line which is angled relative to the sidewall 14 of the trailer 10 when in the fully-opened position.

Illustratively, the trailer 10 further includes first and second bumper deflectors 70, 72. The first bumper deflector 70 is coupled to a first, outer end of the bumper 18 while the second bumper deflector 72 is coupled to a second, outer end of the bumper 18. In particular, each bumper deflector 70, 72 is coupled to a bottom, horizontal bar 74 of the bumper 18 and is configured to extend forward from the bottom, horizontal bar 74 of the bumper 18 in a direction toward a front end of the trailer 10, as shown in FIG. 2-6 such that a plane defined by each bumper deflector 70, 72 is generally parallel to the ground and perpendicular to the sidewalls 14 of the trailer. Illustratively, the rear bumpers deflectors 70, 72 operate to deflect air around to the back or rear end of the trailer 10. Thus, the bumper deflectors 70, 72 operate to further improve the aerodynamic efficiency of the trailer 10.

Illustratively, the bumper deflectors 70, 72 are rigidly secured to the bumper 18 by a fastener including, but not limited to, rivets, screws, bolts, nails, welding, and/or adhesive, for example. Thus, the bumper deflectors 70, 72 do not move relative to the bumper 18. However, it is within the scope of this disclosure to provide one or more bumper deflectors which are able to pivot or otherwise move relative to the rear bumper 18 of the trailer 10.

Illustratively, each bumper deflector 70, 72 is made of a composite material such as that described above with regard to the wall panels 30, 32. For example, the composite material may include a plastic core and metal outer skins coupled to the plastic core. Such a composite material provides a rigid, but lightweight and durable material. Illustratively, for example, each bumper deflector 70, 72 may be made of a DURAPLATE® composite panel provided by Wabash National Corporation of Lafayette, Ind. DURAPLATE® composite panels are constructed of a high-density polyethylene plastic core bonded between two high-strength steel skins, as discussed above in regard to the panes 30, 32 of the skirt system 12. It should be understood that other suitable composite materials may be used as swell. Further, the bumper deflectors 70, 72 may be made of any number of suitable non-composite materials such as metals, metal alloys, and/or plastics, for example.

Illustratively, the first bumper deflector 70 is adjacent the first side skirt system 12 and the second bumper deflector 72 is adjacent the second side skirt system 12. In particular, the rear wall panel 32 of each side skirt system 12 is positioned inwardly of the respective, adjacent bumper deflector 70, 72. As shown in FIG. 4, for example, the connection joint, or hinge, between the rear wall panel 32 and the bumper 18 is adjacent to, but positioned inwardly from, the corresponding rear bumper deflector 70, 72. Illustratively, when the side skirt system 12 is in the fully-closed position, as shown in FIGS. 6 and 7, the outside surface 62 of the front wall panel 30 of each side skirt system 12 is adjacent the respective rear bumper deflector 70, 72. It should be understood, that the removal of the rear bumper deflectors 70, 72 may allow the rear wheel assembly 16 to move further rearwardly toward the rear bumper 18, thus further folding the side skirt systems 12 such that the outside surfaces 62 of the front and rear wall panels 30, 32 may be moved closer to each other.

Further, without the rear bumper deflectors 70, 72, the rear end of the rear wall panel 32 of each skirt system 12 may be coupled to other portions of the rear bumper 18 in order to change the angle of each skirt system 12 relative to the sidewall 14 of the trailer 10. In other words, the rear wall portion 32 may be coupled to the rear bumper 18 at a location on the rear bumper 18 that is outward from the presently-provided location on the rear bumper 18. In fact, the skirt system 12 may define a plane generally parallel to a plane defined by the sidewall of the trailer 10. As such, the trailer 10 may be provided with only the side skirt systems 12 and without the rear bumper deflectors 70, 72. Alternatively, the trailer 10 may be provided with only the rear bumper deflectors 70, 72 and without the side skirt systems 12.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected.

What is claimed is:

1. A side skirt system for reducing drag on a trailer, comprising:
    a side skirt wall configured to be coupled to one side of the trailer to extend generally below a storage container of the trailer at least partially along a length of the trailer, the side skirt wall including (i) a first wall panel having a first end configured to be pivotably coupled to a rear wheel assembly of the trailer and (ii) a second wall panel having a first end pivotably coupled to a second end of the first wall panel and a second end configured to be pivotably coupled to a rear portion of the trailer,
    wherein the side skirt wall is movable between a fully-extended position wherein the first and second wall panels cooperate to define a generally planar side skirt wall and a fully-retracted position wherein the first and second wall panels are angled relative to each other.

2. The side skirt system of claim 1, wherein a front end of the front wall panel is spaced a first distance from a rear end of the second wall panel when the side skirt wall is in the fully-extended position, and wherein the front end of the front wall panel is spaced a second, smaller distance away from the rear end of the rear wall panel when the side skirt wall is in the fully-retracted position.

3. The side skirt system of claim 1, wherein the side skirt wall is angled relative to a sidewall of the trailer when the side skirt wall is in the fully-extended position.

4. The side skirt system of claim 3, wherein a rear end of the side skirt wall is positioned inwardly of a front end of the side skirt wall.

5. The side skirt system of claim 1, further comprising a mounting bracket configured to be coupled to the rear wheel assembly of the trailer, wherein the first wall panel is pivotably coupled to the mounting bracket.

6. The side skirt system of claim 5, wherein the mounting bracket includes a horizontal bar and a vertical post coupled to one end of the horizontal bar, and wherein the first end of the first wall panel is pivotably coupled to the vertical post.

7. The side skirt system of claim 6, wherein the vertical post of the mounting bracket extends downwardly therefrom to define an axis about which the first wall panel pivots.

8. The side skirt system of claim 1, wherein the first and second wall panels are each made of a composite material including an outer skin, an inner skin, and a core positioned between and coupled to the first and second skins.

9. The side skirt system of claim 8, wherein the inner and outer skins are metal and the core is a polymer.

10. A side skirt system for reducing drag on a trailer, comprising:
    a side skirt wall configured to be coupled to one side of the trailer to extend generally below a storage container of the trailer at least partially along a length of the trailer, wherein the side skirt wall is movable between a fully-extended position wherein the side skirt wall generally defines a straight line, and a fully-retracted position wherein a first distance between a front end and a rear end of the side skirt wall is less than a second distance between the front end and the rear end of the side skirt wall when the side skirt wall is in the fully-extended position,
    wherein the front end of the side skirt wall is configured to be coupled to a rear wheel assembly of the trailer for back-and-forth movement therewith, and wherein the rear end of the side skirt wall is configured to be coupled to a rear portion of the trailer.

11. The side skirt system of claim 10, wherein the side skirt wall includes a plurality of wall panels, and the wall panels are generally aligned with each other when the side skirt wall is in the fully-extended position, and wherein outer surfaces of two adjacent panels are substantially facing each other when the side skirt wall is in the full-retracted position.

12. The side skirt system of claim 11, wherein the side skirt wall includes a first wall panel and a second wall panel pivotably coupled to the first wall panel for pivoting movement relative thereto about a generally vertical axis.

13. The side skirt system of claim 12, wherein the side skirt wall further includes a hinge coupled to and positioned between the first and second wall panels.

14. The side skirt system of claim 12, wherein the vertical axis moves inwardly toward the longitudinal axis of the trailer when the side skirt system is moved from the fully-extended position to the fully-retracted position.

15. A trailer and side skirt system for reducing drag on a trailer, comprising:
    a trailer having sidewalls, a floor assembly, a rear bumper coupled to and extending downwardly from the floor assembly, and a rear wheel assembly coupled to the floor assembly, wherein the wheel assembly is movable relative to the floor assembly between a first, forward position wherein the rear wheel assembly is spaced a first distance away from the rear bumper and a second, rearward position wherein the rear wheel assembly is spaced a second distance smaller than the first distance away from the rear bumper; and a side skirt system coupled to the trailer and extending downwardly below the floor assembly of the trailer at least partially along a length of the trailer between the rear wheel assembly and the rear bumper of the trailer, wherein a front end of the side skirt system is configured to move back-and-forth with the rear wheel assembly relative to the floor assembly, and wherein a rear end of the side skirt system is configured to remain generally stationary relative to the floor assembly.

16. The trailer and side skirt system of claim 15, wherein the side skirt system includes a plurality of wall panels pivotably coupled to one another.

17. The trailer and side skirt system of claim 16, wherein the plurality of wall panels includes a first wall panel pivotably coupled to the rear wheel assembly and a second wall panel pivotably coupled at a first end to the first wall panel and at a second end to at least one of the rear bumper, a rear end portion of a slide rail, a rear end portion of a rear end wall, and a rear end portion of the sidewall of the trailer.

18. The trailer and side skirt system of claim 15, wherein the side skirt wall defines a plane generally angled relative to a plane defined by the sidewall of the trailer when the side skirt system is in the fully-extended position.

19. The trailer and side skirt system of claim 18, wherein a rear end of the skirt wall is positioned inwardly relative to the trailer from a front end of the skirt wall.

20. The trailer and side skirt system of claim 15, further comprising a mounting bracket coupled to the rear wheel assembly, wherein the front wall panel of the side skirt wall is pivotably coupled to the mounting bracket.

21. The trailer and side skirt system of claim 15, further comprising a rear bumper deflector for reducing drag on the trailer, wherein the rear bumper deflector defines a horizontally planar body coupled to the rear bumper of the trailer at a location spaced apart from the floor assembly of the trailer, and wherein the rear bumper deflector extends forwardly from the rear bumper toward the rear wheel assembly.

22. The trailer and side skirt system of claim 21, wherein the rear bumper deflector is positioned outwardly from the rear end of the side skirt system.

* * * * *